United States Patent
Ghasemi et al.

(10) Patent No.: US 11,859,121 B2
(45) Date of Patent: *Jan. 2, 2024

(54) VISCOELASTIC ICE PHOBIC SURFACES

(71) Applicant: University of Houston System, Houston, TX (US)

(72) Inventors: Hadi Ghasemi, The Woodlands, TX (US); Peyman Irajizad, Houston, TX (US); Abdullah Al-Bayati, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,898

(22) Filed: Oct. 12, 2022

(65) Prior Publication Data

US 2023/0059418 A1 Feb. 23, 2023

Related U.S. Application Data

(63) Continuation of application No. 16/754,505, filed as application No. PCT/US2018/055793 on Oct. 15, 2018, now Pat. No. 11,499,079.

(60) Provisional application No. 62/572,708, filed on Oct. 16, 2017.

(51) Int. Cl.
| | | |
|---|---|---|
| *C09K 3/18* | (2006.01) | |
| *B64D 15/10* | (2006.01) | |
| *C09D 5/03* | (2006.01) | |
| *C09D 175/04* | (2006.01) | |
| *C09D 177/00* | (2006.01) | |
| *C09D 183/04* | (2006.01) | |
| *C09D 5/00* | (2006.01) | |
| *B64D 15/00* | (2006.01) | |

(52) U.S. Cl.
CPC ................. *C09K 3/18* (2013.01); *B64D 15/10* (2013.01); *C09D 5/03* (2013.01); *C09D 175/04* (2013.01); *C09D 177/00* (2013.01); *C09D 183/04* (2013.01)

(58) Field of Classification Search
None
See application file for complete search history.

(56) References Cited

U.S. PATENT DOCUMENTS 11,499,079 B2 * 11/2022 Ghasemi .................. C09K 3/18

FOREIGN PATENT DOCUMENTS

CN 105390189 A * 3/2016

OTHER PUBLICATIONS

Machine translation of CN 105390189 A (Year: 2016).*

* cited by examiner

*Primary Examiner* — Ramsey Zacharia
(74) *Attorney, Agent, or Firm* — Jackson Walker LLP

(57) ABSTRACT

Viscoelastic icephobic surfaces of the present disclosure include organogel particle beads dispersed in an elastomer matrix. The surfaces are highly repellant to ice formation, easy and cost efficient to apply, and have long term durability for harsh outdoor applications.

6 Claims, 12 Drawing Sheets a) Before applying wind a) After applying wind → Gel beads → Si rubber

VISCOELASTIC ICE PHOBIC SURFACES

This application is a continuation of and claims priority to U.S. patent application Ser. No. 16/754,505, filed Apr. 8, 2020, entitled "Viscoelastic Icephobic Surfaces," which is a 371 application of PCT/US18/55793, filed Oct. 15, 2018, which claims priority to U.S. Provisional Patent Application No. 62/572,708, filed Oct. 16, 2017, entitled "Nano-Viscoelastic Anti-Icing Surfaces," the entire contents of which are hereby incorporated by reference.

BACKGROUND OF THE INVENTION

This disclosure pertains to anti-icing surfaces that are ice phobic as well as flexible, durable, and useful for a variety of applications.

Anti-icing surfaces play a critical role in a broad range of systems including infrastructure and energy systems. In cold climates and during winter storm events, the absence of these surfaces can lead to catastrophic failures in power systems (e.g. power towers, power stations, and power lines), transportation systems (e.g. aviation industry and ocean-going vessels) and energy systems (e.g. domestic and large power plants). According to Lawrence Berkeley Laboratory, ice storms account for 10% of power transmission outages in the U.S. The financial loss is approximated as $3-5 billion annually. In addition to financial losses, around 3 million people in the U.S. every winter suffer from power losses caused by ice storms. Icing may lead to collapse of poles and towers and rupture of conductors. In the aviation industry, icing on aircrafts results in increased drag and loss of lift force, potentially leading to catastrophic events. Icing in cooling systems significantly drops the heat transfer rate and leads to inefficient operation of these systems.

The main figures of merit for ice phobic surfaces are low freezing temperature, low ice accretion rate, and low ice adhesion. Furthermore, long-term durability of these surfaces is another critical factor. Multiple products (e.g. super hydrophobic, non-wetting, liquid-infused, and hydrated surfaces) have been developed to reduce or prevent ice accumulation. However, high ice adhesion strength (~20-100 kPa) and subsequent ice accretion, low long-term mechanical and environmental durability, and high production cost have restricted their applications.

SUMMARY OF THE INVENTION

The present disclosure relates generally to surfaces that are ice phobic. In particular, the ice phobic surfaces are nano-viscoelastic surfaces that are spray-able, flexible, durable, and universal in their applications. The nano-viscoelastic surfaces have unprecedented anti-icing characteristics, are low in cost, and are resistant to high shear flows.

Generally, the present nano-viscoelastic surfaces can be prepared by (1) developing silicon-based organogel particle beads, (2) mixing the particle beads with a surfactant and crushing the mixture to reduce aggregation, (3) separately preparing an elastomer matrix having a high shear modulus from suitable types of elastomers, such as silicone elastomers, to serve as a host for the developed gel beads, (4) incorporating the developed organogel particle beads prepared in step (2) within the prepared elastomer matrix, and (5) applying the final mixture to any surface and letting the mixture cure at room temperature to obtain the final nano-viscoelastic icephobic surface.

The nano-viscoelastic anti-icing surfaces are stable under high shear flows and high and low temperatures. The surfaces demonstrate enhanced anti-icing characteristics with long term durability for harsh outdoor applications. A new physical concept called stress-localization contributes to the effectiveness of the present icephobic surfaces, which have exceptional mechanical, chemical and environmental durability. The concept of stress localization reduces ice adhesion on these materials by an order of magnitude and is far more effective than previously studied surface-modified methods. Stress-localization is a volumetric phenomenon and remains effective even after long duration of operation of these materials. Furthermore, the icephobic material does not affect aerodynamic characteristics of airfoils offering a promising solution for aerospace applications.

DETAILED DESCRIPTION OF THE INVENTION

The present disclosure relates to anti-icing surfaces, and particularly to anti-icing surfaces that have nano-viscoelastic characteristics and are highly flexible, durable, and universal in application.

The present icephobic material shows extremely low ice adhesion while having long-term mechanical, chemical and environmental durability. The icephobic material, stress-localized viscoelastic material, utilizes elastic energy localization at the ice-material interface to shear the interface. With minimal applied force, cracks are formed at the interface generating local stress fields. This shear stress advances cracks at the interface to detach ice form the material. This icephobic material is a smooth coating and would not affect the aerodynamic properties of a surface such as airfoil.

Figure 1A:
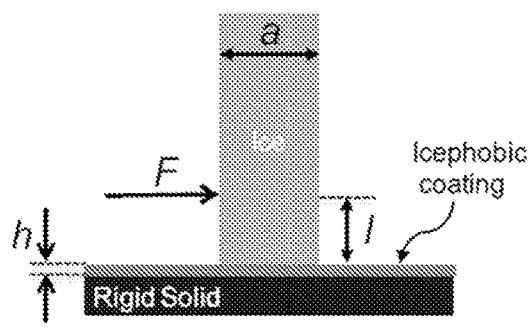
FIG. 1A shows a schematic of ice detachment from a material with an icephobic coating.

Once ice forms on a surface, the interaction between ice and the substrate is governed by van der Waal's force, electrostatic forces or hydrogen-bonding forces. A wide range of surfaces has been studied to reduce ice adhesion strength. Among those, elastomers have shown minimum ice adhesion and have the potential to achieve exceptional icephobic properties. Consider a rigid ice phase attached to an elastomer as shown in FIG. 1A. If a shear force is applied in the ice-elastomer plane, the ice would only slide with no detachment from the surface. However, if the force is applied at a plane higher than the interface, the ice would detach at a critical stress. It has been shown that the elastic instability at the interface of a rigid body and an elastomer is responsible for fracture. The fingers developed at the contact line by elastic instability elongate and break down in the form of bubbles that help in propagation of crack at the interface. The threshold for bubble formation depends on the shear modulus of the elastomer. For a uniform elastomer with isotropic properties, one finds that the adhesion stress at the interface (as) is written as:

$$\sigma_S \cong \left(\frac{a}{l}\right)\sqrt{\frac{W_a G}{h}}$$

where a and l are the geometrical parameters as shown in FIG. 1A, $W_a$ is the work of adhesion, G is the shear modulus, and h is the thickness of the elastomer. This formulation suggests that low ice adhesion can be achieved through low values of G and $W_a$. Note that the value of G can be tuned by several orders of magnitude, but the value of $W_a$ in the best case can be tuned by an order of magnitude (e.g. introduction of perfluorinated groups on a surface). By tuning the substrate from hard elastomers (G~1 GPa) to gel (G~1 Pa), low values of ice adhesion has been achieved. However, low values of G lead to low mechanical durability of the icephobic coatings, which results in poor long-term performance. The values of a, l and h are determined by dimensions of experimental instrument and icephobic material. Inconsistency in these dimensions in measuring of ice adhesion has resulted in scattered data of ice adhesion for the same substrate. For example, the reported values of ice adhesion for PDMS varies in the range of 100-800 kPa.

Figure 1B:
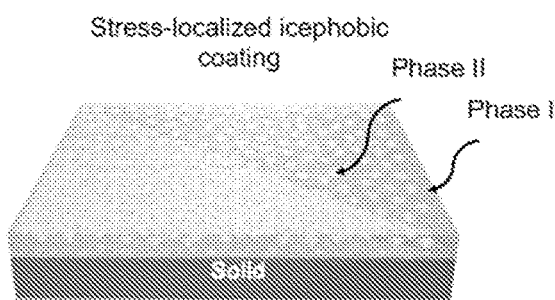
FIG. 1B shows a schematic diagram of stress-localized icephobic coatings in accordance with preferred embodiments described herein.

A standard method to measure ice adhesion is described in Example 2 below. In the above formulation, an isotropic elastomer was considered, which resulted in a direct dependence of GS on G. However, once local phases with low shear modulus, such as those in the present icephobic surfaces, are introduced at the ice-material interface, as shown in FIG. 1B, with minimal force, ice is detached from local phases and forms a local crack. This local crack induces an elastic stress field around the crack. This induced shear stress field opens the crack front and leads to propagation of crack at the interface. That is, the induced stress field by local phases leads to crack growth and failure. Through mathematical formulation of the discussed physics, the ice adhesion strength on these surfaces is written as $$\sigma_S \sim g(\varphi_{II})\left(\frac{a}{l}\right)\sqrt{\frac{\overline{W_a} G_m}{h}}$$

where $g(\phi_{II})$ denotes the stress-localization function, (p H is the volumetric fraction of phase II, $\overline{W_a}$ is the work of adhesion of the material, and $G_m$ is the shear modulus of the material. The values of $\overline{W_a}$ and $G_m$ depend on properties of individual phase I and II, their volumetric fraction and their geometry. The salient feature of this formulation is the stress-localization function, which plays a critical role in the adhesion of ice to the material and its impact is far more effective than other parameters studied before (i.e. work of adhesion and shear modulus). This localization function reduces the adhesion of a solid on an elastomer by an order of magnitude as demonstrated and discussed below.

Figure 1C:
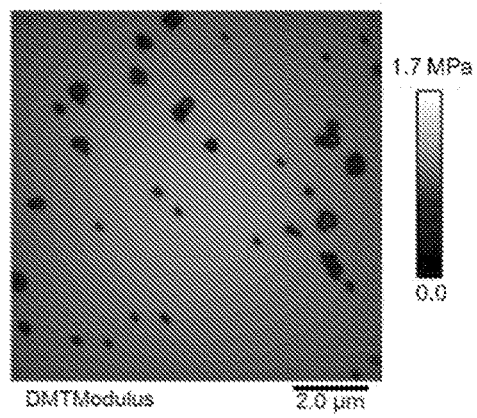
FIG. 1C shows a surface map of elastic modulus of stress-localized icephobic coatings in accordance with preferred embodiments described herein.
Figure 1D:
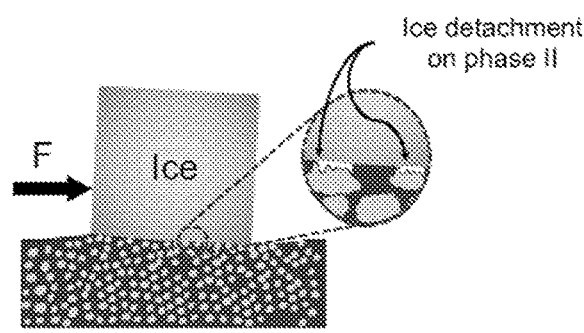
FIG. 1D shows a schematic of a formation of a crack and detachment of ice at a Phase II coordinate in stress-localized icephobic coatings in accordance with preferred embodiments described herein.

Based on the developed stress-localization concept, a new form of icephobic surface, stress-localized viscoelastic material was developed. The material includes a matrix as Phase I with high shear modulus and highly dispersed phase II with low shear modulus. An exemplary procedure for development of one embodiment of these materials is given in Example 2 below. Phase I is a silicon elastomer and Phase II is a silicon-based organogel. As the matrix of this material plays a major role in long-term mechanical durability, it is crucial to choose an elastomer with high shear modulus. The preferred silicone elastomers are room temperature vulcanizing (RTV) with certain mechanical properties. To form a homogenous material, compatibility of the matrix and the dispersed phase is critical. Thus, silicon-based organogel particles with dimension of 2-20 μm are preferred. Other combinations of elastomers and the dispersed phases may be used as long as they provide a homogenous material. Once the material is developed, its viscosity can be adjusted through a solvent. Here, hexamethyldisiloxane is used in preferred embodiments to reduce the viscosity of the material. In the dilute form, the material can be brushed or sprayed to form a uniform coating. Once applied, the material is completely cured after 24 hrs. The surface of these materials was examined through Scanning Probe Microscopy (SPM) (Bruker Multimedia 8 SPM) to determine distribution of Phase II on the surface. FIG. 1C shows modulus of elasticity of both phases. As shown Phase II has much smaller modulus than that of the matrix. FIG. 1D shows a representation of a formation of a crack at a coordinate of Phase II with minimal forces.

Figure 2:
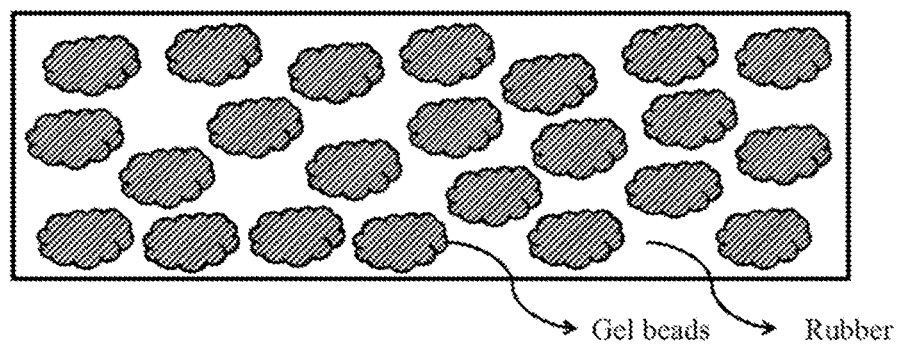
FIG. 2 shows a schematic of a nano-viscoelastic and anti-icing surface prepared in accordance with preferred embodiments described herein.

FIG. 2 shows a schematic of a viscoelastic anti-icing surface prepared in accordance with preferred embodiments of this disclosure. The icephobic surface includes a phase of organogel particles (also referred to as Phase II) dispersed throughout an elastomer matrix (also referred to as Phase I). Preferred concentrations of organogel particles in the elastomer matrix are about 1% to about 99% based on volumetric ratio, and more preferred concentrations are about 5% to about 85%. The Phase II particles should be generally dispersed throughout the elastomer matrix to avoid accumulation of particles in isolated regions.

The viscoelastic icephobic surfaces can utilize a variety of different elastomers that serve as a host or matrix. In certain embodiments the elastomer can be a room-temperature-vulcanizing (RTV) silicone rubber prepared using a suitable base and a curing agent. Additional preferred elastomers may include polyurethane, poly isoprene, fluoroelastomers, and the like. The selected elastomer should have a high shear modulus.

Different types of gels can also be used as Phase II particle beads to be integrated within the elastomer matrix. The gel beads may be made of organogels (gels made of hydrocarbons), polyacrylamide, polydimethylsiloxane (PDMS), or other suitable materials. The gel beads may be mixed with a variety of different surfactants, including butyl butyrate, propylene glycol, and silicone (Si) oil, and crushed prior to incorporation into the rubber or polymer matrix. In preferred embodiments, the organogel particles include tuned liquid organic phases (non-crosslinked components in the gel matrices) entrapped within a solid phase (three-dimensionally crosslinked gel network). In certain preferred embodiments, the organogel particles are made up of combinations of siloxanes, silicas, and ethyl benzene. In additional preferred embodiments, the organogel particles are made up of a combination of dimethyl siloxane, dimethylivinyl terminated silica, dimethylvinylated silica, trimethylated silica, tetra (trimethoxysiloxy) silane, ethyl benzene), dimethyl, methylhydrogen siloxane, and tetramethyl tetravinyl cyclotetra siloxane. In additional preferred embodiments, the organogel particle beads are polydimethylsiloxane based. The gel beads incorporated into the elastomer matrix are preferably about 10 nm to about 100 microns in diameter, and more preferably about 2 to about 20 microns.

Generating the nano-viscoelastic surfaces from different materials allows for alteration of the properties of the product, which also allows for adjusting the desired durability and ice adhesion properties based on the desired function for the surface. Table 1 below illustrates some types of materials that may be used to develop preferred embodiments of the nano-viscoelastic surfaces.

TABLE 1

| | Gel beads | | |
| Matrix | Organogel beads + Butyl butyrate | Polyacrylamide + propylene glycol | PDMS (SYLGARD 184) + Si oil |
| --- | --- | --- | --- |
| Polyurethane | PU1 | PU2 | PU3 |
| Poly isoprene | PO1 | PO2 | PO3 |
| Silicone rubber | SI1 | SI2 | SI3 |

The nano-viscoelastic anti-icing surfaces are physically and chemically stable while maintaining extremely low ice adhesion properties. In preferred embodiments, the nano-viscoelastic surfaces are applied to a surface in need of protection from icing by spraying the uncured material to the base surface and allowing the material to cure to form the anti-icing surface. An important factor for the long term durability of anti-icing surfaces is their ability to adhere to the surface and also their ability to withstand severe abrasion. These factors become increasingly relevant for outdoor operation. Most current anti-icing technologies cannot demonstrate this physical stability for prolonged durations. The current nano-viscoelastic surfaces have been tested and verified to have physical stability in these conditions.

The present anti-icing surfaces are highly durable icephobic materials. These materials utilize stress-localization to initiate cracks at the ice-material interface and consequently minimize ice adhesion on the surface. Stress-localization leads to a shear force at the interface for detachment of ice from the material. The developed concept is implemented in elastomers and the superior icephobicity of these materials compared to state-of-the-art materials is demonstrated. These forms of icephobic materials demonstrate excellent mechanical, chemical and environmental durability with no change of characteristics under extreme air and water shear flows. Furthermore, these icephobic materials do not change the aerodynamic characteristics of airfoils thereby providing a promising solution for aerospace application. In contrast to surface modified coatings, the icephobicity of these materials is a volumetric property and no degradation in the performance occurs in long-term operation under mechanical loadings. The developed concept of stress-localization reduces adhesion of solids on a material by an order of magnitude with no compromise in mechanical properties. The developed icephobic materials could be used to minimize adhesion of any solid species (i.e. ice, gas hydrate, dust, and even bio-species) on a surface with omnipresent application in transportation systems (aviation, cars and vessels), energy systems, and bio-sciences.

Example 1

To verify the properties of the nano-viscoelastic surfaces, testing was carried out on a preferred embodiment identified in Table 1 above as SI3. Sample SI3 was created by preparing polydimethylsiloxane (PDMS) beads (SYLGARD® 184, The Dow Chemical Company), then mixing and crushing the PDMS beads in a silicone (Si) oil surfactant until the beads are nano-micro sized, or about 10 nm to about 200 microns. A polymer base of silicone rubber was separately prepared and the crushed beads were added to the silicone rubber base. Prior to curing, a portion of the polymer bead mixture was applied to a surface made of glass at a thickness of about 400 microns and a width of about 25 mm and a length of about 70 mm, then allowed to cure for 30 minutes to prepare a SI3 sample surface.

Figure 3:
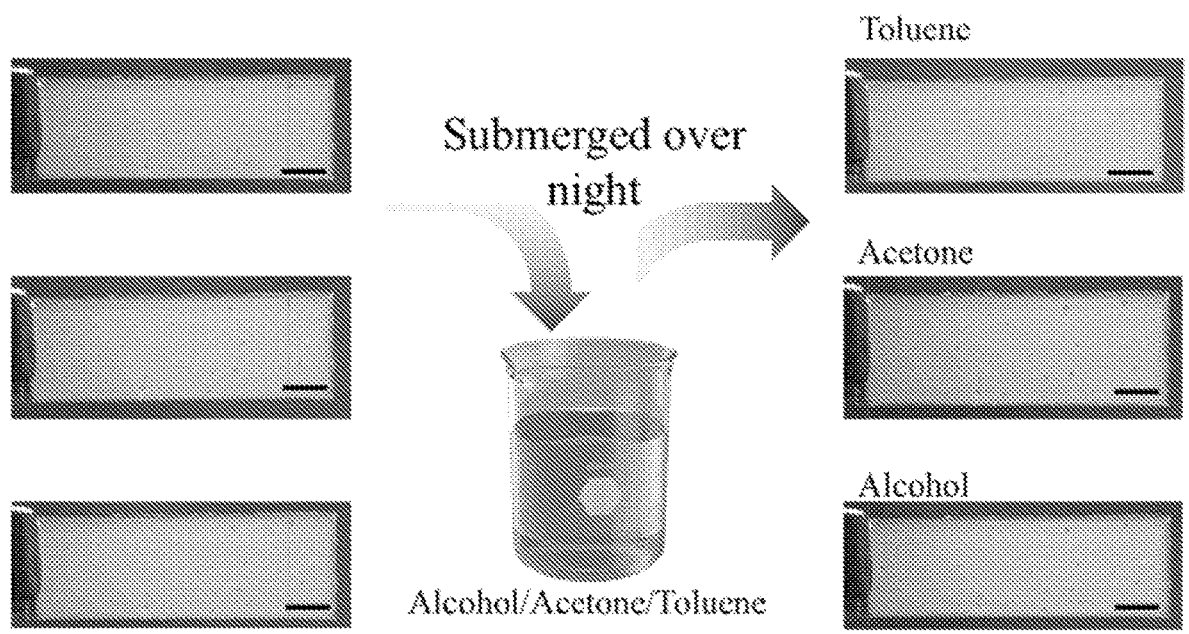
FIG. 3 shows images of sample nano-viscoelastic surfaces before and after submersion in solvents, with a scale bar of 10 mm.

To test chemical stability, the SI3 sample surfaces were submerged in separate containers containing the solvents alcohol, acetone, or toluene at room temperature overnight. FIG. 3 shows the sample products before and after submersion overnight. No changes were observed on the surfaces after complete submersion in the chemicals overnight. Thus, sample SI3 was chemically inert to these materials, demonstrating long term durability.

Figure 4:
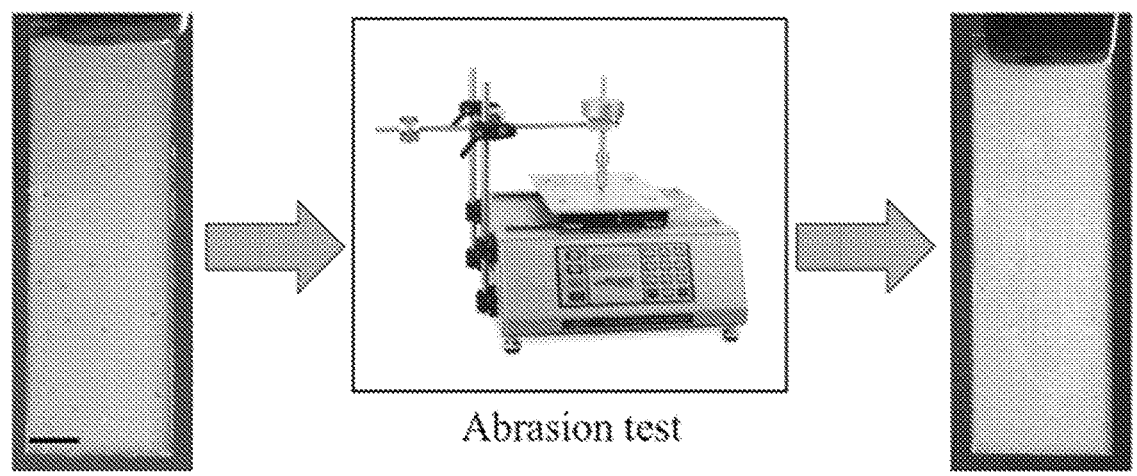
FIG. 4 shows images of a sample nano-viscoelastic surface before and after 1000 cycles of an abrasion test, with a scale bar of 10 mm.

An abrasion test was carried out with 2 newton force directly applied onto the surface of the SI3 sample using linear TABER® Abraser equipment (Taber Industries, New York, USA) with CS-10 as the fine abrader and H-18 as the medium abrader. The as-prepared sample was clamped down and tested for 10,000 abrasion cycles. FIG. 4 shows the SI3 sample surface before and after running the abrasion test. Only 97 microns of the surface was removed, which is considerably less material loss compared to current state-of the art technologies, thereby proving physical stability and durability.

Figure 5:
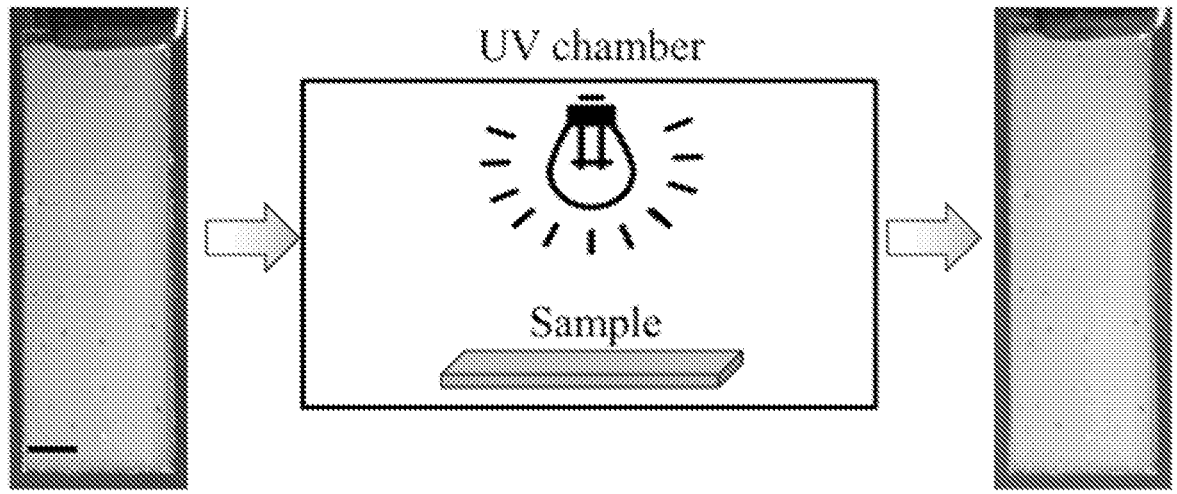
FIG. 5 shows images of a sample nano-viscoelastic surface before and after UV radiation exposure for 500 hours, with a scale bar of 10 mm.

To further evaluate the physical durability of these anti-icing surfaces, sample SI3 was tested for UV radiation effects. The sample was placed in a fluorescent chamber for 500 hours to be fully exposed to UV radiation. FIG. 5 shows the SI3 sample before and after spending 500 hours in a UV radiation chamber with a wavelength of 250-400 nm and a lamp power of 40 W. After removing the sample from the UV chamber, no cracks or material degradation were spotted. The sample was then re-examined using the abrasion test under 2 N force after UV radiation exposure. The amount of material removed from the product was 101 microns, again a very small amount of material.

Figure 6:
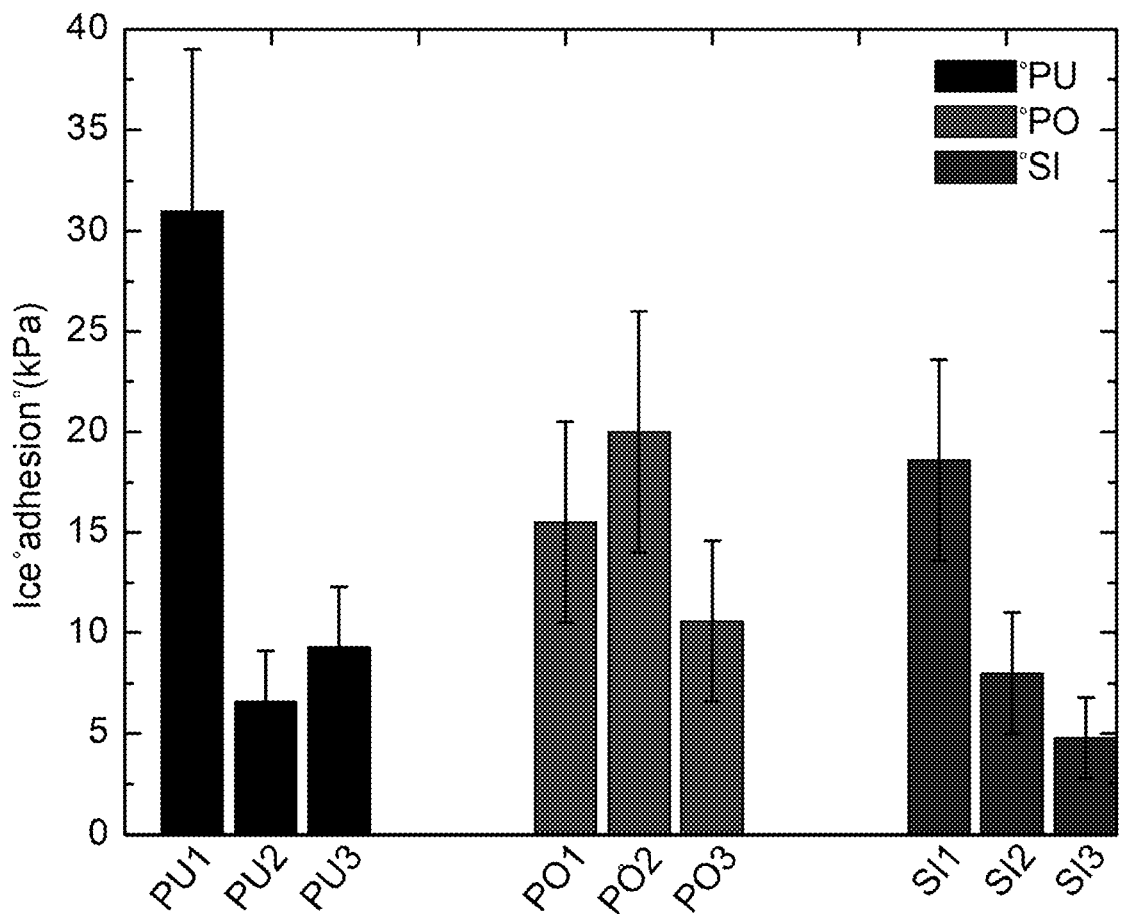
FIG. 6 shows results of ice adhesion tests for various sample nano-viscoelastic surfaces measured at −15° C.

The anti-icing characteristics of the sample surfaces identified in Table 1 were also studied. Sample surfaces were generally prepared according to the details provided above for the preparation of the SI3 sample surface, using different gel beads, surfactants, and polymer, to provide similarly sized sample surfaces. The ice adhesion strength on the sample surfaces was measured through direct applied shear stress. In this approach, a rectangular cuvette was placed on the cold sample. The cuvette was filled with water for ice formation on the sample. The formed ice was left for 1 hour on the surface before the measurement. A shear force was applied tangentially to the ice cube and measured using a digital force gauge such as the IMADA DS2-110 (Imada, Inc., Northbrook, Illinois) to determine the detachment force required to remove the ice from the surface. The detachment force divided by the ice-sample surface area gave the ice adhesion strength. FIG. 6 shows the results of ice adhesion measurements taken at −15° C. for various sample surfaces shown in Table 1. Sample surface SI3 provided a consistent average ice adhesion of 4.5 kPa±2 at −15° C. which was independent of the number of icing/de-icing cycles. This also demonstrates the durability of these surfaces for anti-icing applications. The anti-icing properties of sample SI3 were also re-examined after the abrasion test and the average ice adhesion was still found to be 4.5 kPa±2 at −15° C.

Figure 7:
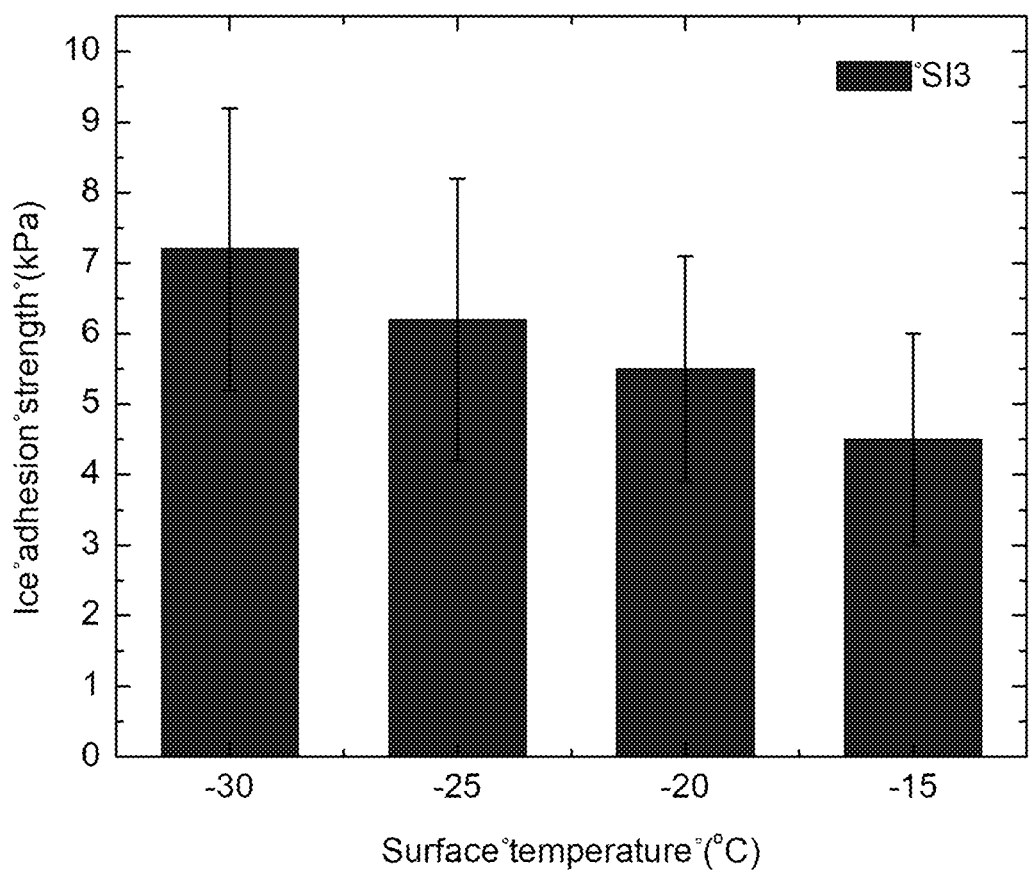
FIG. 7 shows results of ice adhesion tests for a sample nano-viscoelastic surface at various surface temperatures.

Multiple ice adhesion measurements were taken for sample SI3 to evaluate the performance of the sample at different temperatures using the process described above. FIG. 7 shows the average ice adhesion measurements for sample SI3 at different surface temperatures. Even at very low temperatures of −30° C., the ice adhesion strength on the sample surface was relatively low.

Figure 8:
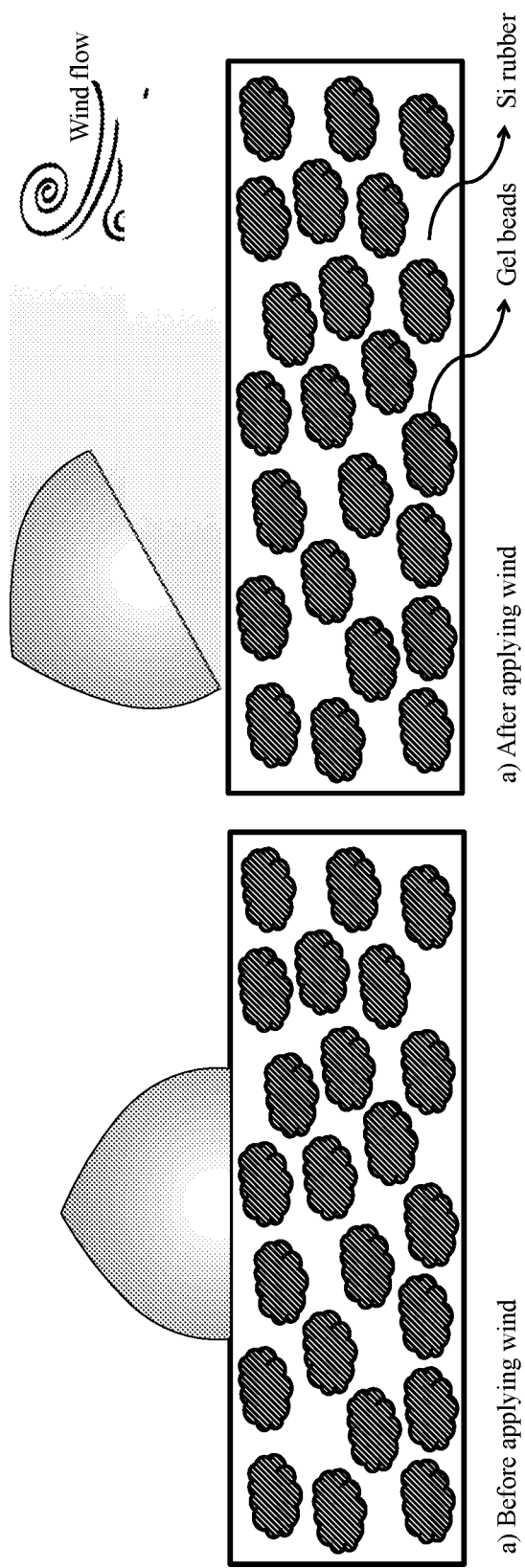
FIG. 8 shows a schematic of an anti-icing process on a sample nano-viscoelastic surface before and after applying a 17 m/s wind.

Additional tests were also carried out on sample surfaces identified in Table 1. The mass change of the surfaces was studied several months after the surfaces were prepared, and no sign of any mass change was observed. The sample surfaces were also stored at 100° C. for more than 24 hours, which no change in mass or other characteristics observed following this heat treatment. The sample surfaces were also stored at −30° C. for more than 5 hours to measure shrinkage effects, but the results were found to be negligible. Low ice adhesion properties were demonstrated in sample SI3 by inducing a 17 m/s average air velocity across the surface having ice droplets. FIG. 8 shows a schematic of the sample surface having an ice droplet before applying the wind, then after applying the wind at 17 m/s.

Example 2

Exemplary stress-localized icephobic materials were developed. Phase I, the elastomer, was a RTV-1 silicone rubber. The RTV-1 silicone rubber had the material properties of: Elongation at break—500%, Hardness Shore A—30, Tensile strength—8 N/mm$^2$, Viscosity, dynamic at 20° C.—300000 mPa·s, Density at 23° C. in water—1.1 g/cm$^3$, and tear-strength—13.5 N/mm.

Phase II, organogel particles, consisted of tuned liquid organic phases (non-crosslinked components in the gel matrices) entrapped within a solid phase (three-dimensionally crosslinked gel network). The procedure for development of these organogels was: 10 mL of base (SYLGARD 184, Dow Corning—Dimethyl siloxane, dimethylivinyl terminated, Dimethylvinylated and trimethylated silica, Tetra (trimethoxysiloxy) silane, and Ethyl benzene) was mixed with 1 mL of curing agent (SYLGARD 184, Dow Corning—Dimethyl, methylhydrogen siloxane, Dimethyl siloxane, dimethylvinyl terminated, Dimethylvinylated and trimethylated silica, Tetramethyl tetravinyl cyclotetra siloxane, and Ethyl benzene). 100 mL of an organic liquid (i.e. Polydimethylsiloxane (PDMS), or silicone oil) was added to this mixture. The solution was then vigorously mixed to obtain a homogeneous solution. The precursor sample was heated at 100° C. for 4 hrs in a petri dish. The final product was a non-syneresis organogel. Non-syneresis property of organogel comes from miscibility of the components and silicone oil with PDMS before and after gelation. Generally, the organogel particles are made up of a cross-linked polydimethylsiloxane network with entrapped silicone oil.

Once phase II was developed, it was crushed in the presence of silicone oil for ten minutes to avoid aggregation of gel particles. The solution was filtered to remove excess oil. The final product was a batch of gel particles with dimension in the range of 2-20 μm. The particles were mixed with the elastomer in a pre-defined concentration, preferably about 1 to 99% based on volumetric ratio. The solution was diluted with a solvent, hexamethyldisilaxane, to reduce viscosity for spraying on a surface.

Figure 9:
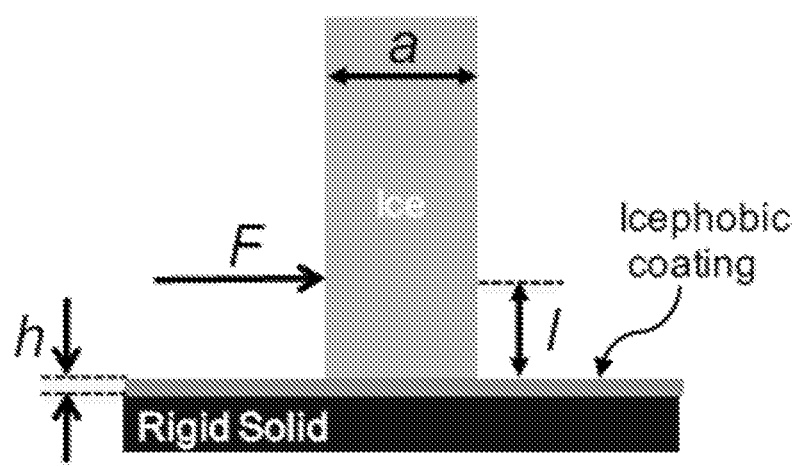
FIG. 9 shows a schematic of a setup for ice adhesion measurements.

A standard procedure to examine ice adhesion on various materials was developed and utilized. Standard protocol was followed for all the measurements. The schematic of experiments is shown in FIG. 9. The test chamber was cooled at a rate of −2° C./min to the target temperature. Temperature of the cooling plate was monitored using a thermocouple on top of the plate. Four exemplary types of icephobic materials were created through tuning the volumetric ratio of phase II in the material. AI-10, AI-11, AI-12, and AI-13 stand for 67%, 50%, 33%, 25% of phase II, respectively.

The icephobic sample was placed on the cooling plate. A square acrylic cuvette with dimension of 15 mm by 15 mm was fabricated with laser cutter with an accuracy of 100 µm. The edges of cuvette were coated with Silane in order to achieve low surface energy and minimize adhesion of cuvette to the icephobic surface. This step minimizes the errors in ice adhesion measurements. The cuvette was filled with deionized water and was allowed to freeze for 1 hr. Ice column encased in acrylic columns was adhered to the test samples. The force required to detach each ice column was measured by propelling the 0.8 cm diameter probe of a force transducer (Imada, model DS2-110) to the side of the ice columns at a constant velocity of 0.1 mm/s. The probe velocity was controlled using a syringe pump. The center of probe was located at 1 mm above the material surface. The measured maximum force at break was converted into ice adhesion strength by dividing by the known cross-sectional area (2.25 cm$^2$) of the ice-substrate interface. The entire experiment was conducted in a low-humidity nitrogen atmosphere to minimize frost formation on the samples and the test apparatus.

Figure 10A:
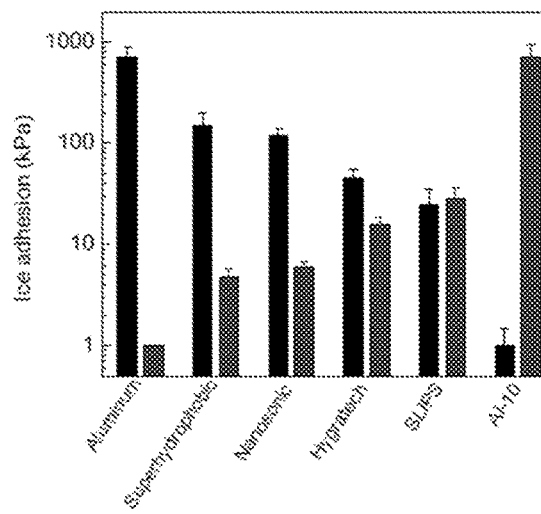
FIG. 10A shows ice adhesion values for state of the art technology compared to stress-localized icephobic coatings in accordance with preferred embodiments described herein.

The measured values of ice adhesion at temperature of −25° C. on all these samples are shown in FIG. 10A. With the same experimental protocol, ice adhesion was measured on other state-of-the-art icephobic coatings and included in FIG. 10A. The reported value of ice adhesion ($\sigma_S$) was the average of ten measurements. In the protocol of ice adhesion. All the samples had the same thickness of 300+20 CD. As shown, ice adhesion on AI-10 is an order of magnitude lower than other state-of-the-art surfaces. This low ice adhesion is believed to be achieved through stress-localization. Another important metric for assessment of ice adhesion on coatings of uniform thickness is ice adhesion reduction factor (ARF) which is defined as ARF=$\sigma_S$ (Al)/$\sigma_S$ (icephobic material). This criterion is a non-dimensional figure to determine ice adhesion, independent of geometry of measurement setup. The ARF values for various samples are included in FIG. 10A, showing that AI-10 reduces ice adhesion by 800 times compared to Aluminum substrate.

Figure 10B:
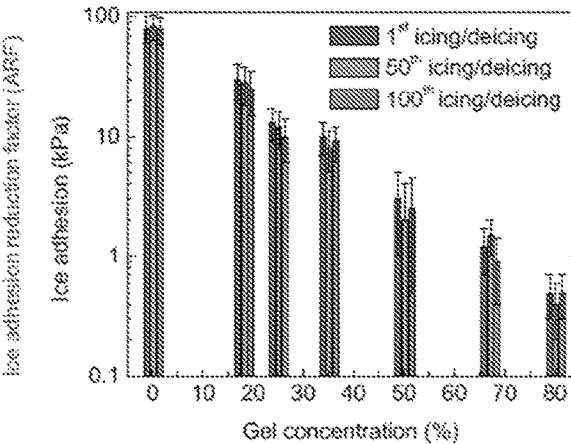
FIG. 10B shows ice adhesion values for various concentrations of Phase II gel particles and various icing/deicing cycles for stress-localized icephobic coatings in accordance with preferred embodiments described herein.

For some of the state-of-the-art materials, ice adhesion depends on the number of icing/deicing cycles as the properties of these materials (i.e. surface characteristics) changes. For example, for liquid-infused surfaces, the depletion of liquid on the surface adversely affects cyclic ice adhesion. For the developed stress-localized icephobic surfaces, ice adhesion up to 100 icing/deicing cycles was determined. For these experiments, once the ice column was detached from the substrate, a new cuvette was placed on the sample and the procedure for ice formation was repeated. After complete formation of ice column, standard procedure was followed to measure ice adhesion. For the same sample, these experiments were conducted up to 100 times during a week to demonstrate consistency of ice adhesion on these icephobic surfaces and no change was observed. These experiments were conducted for various grades of these materials. FIG. 10B shows results.

Figure 10C:
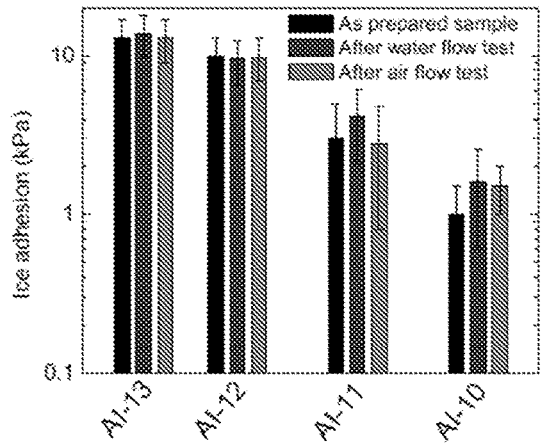
FIG. 10C shows ice adhesion values for stress-localized icephobic coatings in accordance with preferred embodiments described herein as prepared and following exposure to water and air shear.

To assess ice adhesion of these materials in harsh environments, the icephobic coating was exposed to high shear flow of water and air up to Reynolds number of 2×10$^4$ and 3×10$^4$ respectively for one month. For these experiments, icephobic material was coated on a glass substrate through spraying. The sample was left to cure for 24 hr. The ice adhesion on the sample was measured through the protocol described above. Next, the coated glass substrate was placed in a tube and initially was exposed to shear flow of water with Reynolds number of 20000. The sample was left under high shear flow for one month. After this time period, the ice adhesion on the sample was re-measured. The same sample was moved to another setup and was exposed to shear flow of air with Reynolds number of 30000 for one month. The ice adhesion on the samples was remeasured after this experiment. No change in the ice adhesion was observed. FIG. 10C shows results.

Figure 10D:
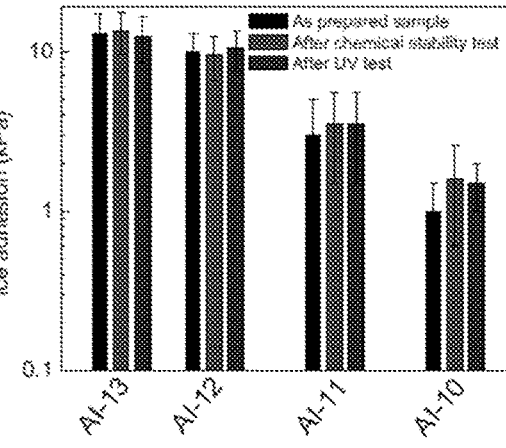
FIG. 10D shows ice adhesion values for stress-localized icephobic coatings in accordance with preferred embodiments described herein as prepared and following exposure to chemical environments and UV.

To resemble samples exposed to various chemical environment, the icephobic samples were exposed to solutions with pH ranging 1-13 and re-examined using the standard ice adhesion protocol. FIG. 10D shows results. Furthermore, to demonstrate long-term ice adhesion of samples exposed to UV radiation in the environment, the samples were placed in a UV chamber and kept for 4 weeks. The ice adhesion before and after UV exposure remained unchanged, as shown in FIG. 10D.

Figures 11A, 11B:
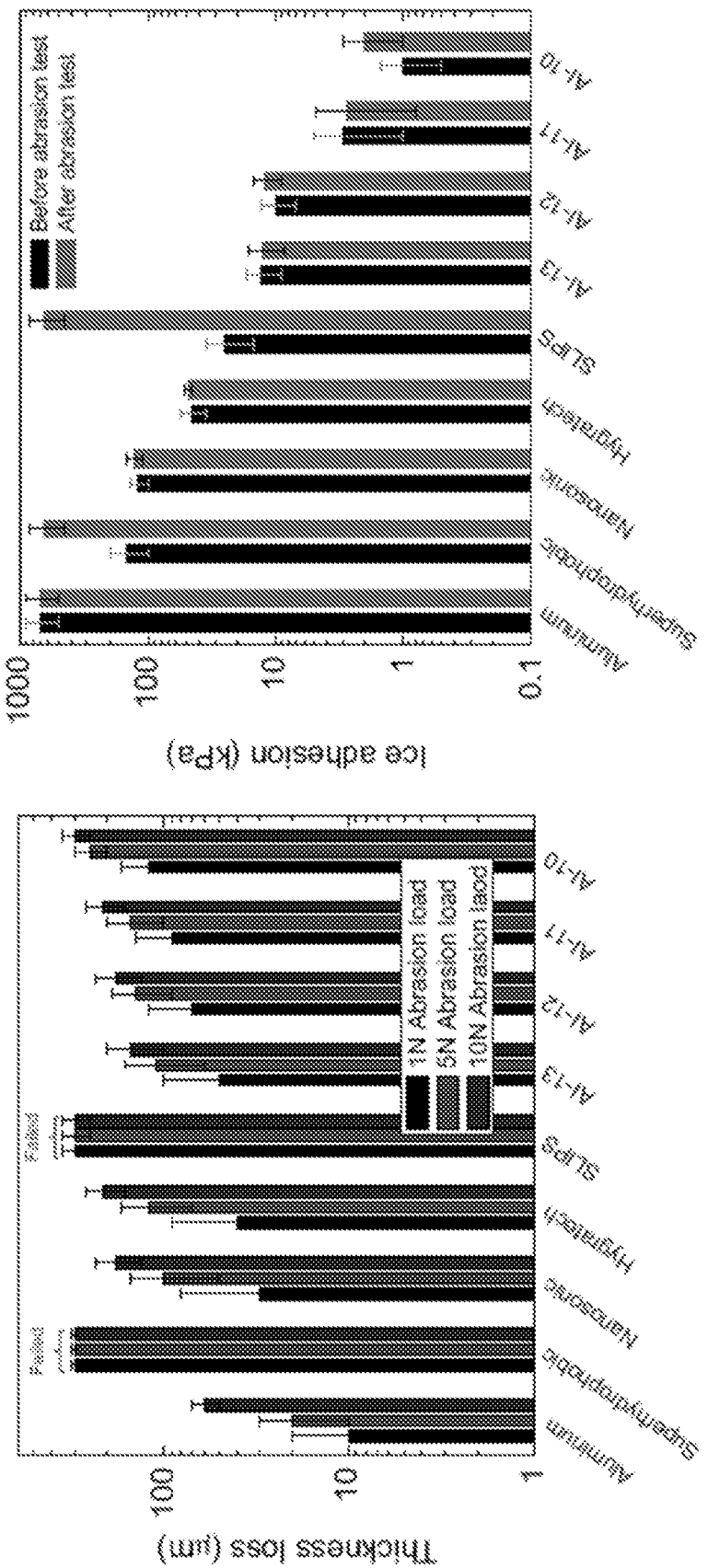
FIG. 11A shows thickness of state of the art technologies compared to stress-localized icephobic coatings in accordance with preferred embodiments described herein following abrasion.
FIG. 11B shows ice adhesion of state of the art technologies compared to stress-localized icephobic coatings in accordance with preferred embodiments described herein following abrasion.

Mechanical, chemical and environmental durability of the developed icephobic materials were also examined. The mechanical durability of the icephobic coatings was examined through Taber abrasion test (Taber Reciprocating Abraser, Model 5900) according to ASTM D4060. In these experiments, material removal for different samples as various loading conditions (i.e. 1, 5, and 10 N) was measured. Samples were placed firmly on a horizontal plate in the Taber instrument and 1000 abrasion cycles applied in each experiment. Superhydrophobic surfaces and SLIPS failed all the tests. AI-10 (67% phase II concentration) failed the 10 N abrasion test. However, other AI samples passed the tests in all loading conditions. The thickness removal in the abrasion tests are shown in FIG. 11A. After abrasion test under 5 N loading for 1000 cycles, the icephobic performance of coatings exposed to mechanical loadings was re-examined. The ice adhesion for these samples along with state-of-the-art icephobic surfaces are shown in FIG. 11B. As shown, no measurable change in ice adhesion was observed and the AI samples offered minimal ice adhesion. In contrast to surface-modified materials (i.e. superhydrophobic surfaces or hydrated-surfaces), the stress-localization property of these materials is volumetric and does not change as they abrade. This feature ensures low ice adhesion on these stress localized viscoelastic surfaces for long-term performance. As another metric for its mechanical durability, the icephobic coating was abraded through sand paper and iron file. No change in its properties was measured. The coating holds its low ice adhesion as the icephobic characteristics is a volumetric property and not a surface property.

Depending on the application, the icephobic coatings may be exposed to various chemical environments. The chemical stability of the AI coatings was examined in a range of solutions with pH between 1-13. The acidic solutions were prepared through various HCl and water concentrations. The basic solutions were Tris 0.15 mM NaCl (pH=8) and Sodium hydroxide (pH=13) solutions. The samples were soaked in these solutions for 48 hrs. There was no change in the integrity of the coatings after being exposed to these chemical environments. No change in the ice adhesion on these coatings after chemical stability test was detected. To assess environmental durability of icephobic coatings, the samples were tested for UV radiation effects. The icephobic sample was placed in a chamber for 500 hours under UV radiation. No cracks or material degradation or changes to the material's durability were spotted. After UV exposure, the icephobic coating was re-examined under abrasive loading of 5 N. The amount of material removed from the coating remained the same as before UV radiation. That is, the integrity of the coating is not affected by UV radiation.

Finally, to demonstrate on-field repairability of this coating, the coating was damaged with a sharp blade to remove a part of material. The coating was then repaired by spraying of a new coating. The newly sprayed icephobic material was integrated within the coating and no visible change in the coating was observed. The repaired surface kept its integrity and icephobic properties.

In aerospace applications, icephobic coatings should have minimal effect on the aerodynamic characteristic of the airfoil (i.e. drag and lift). To examine these characteristics, a wing with a cross section close to NACA 6415 airfoil profile was chosen. The experimental setup included two wing sections, which were removed from a small, commercially available wind turbine (ALEKO Vertical Wind Power Generator) in which they were used as the turbine blades to generate torque for a small generator. Of the two wing sections, one was coated with an example of the icephobic coating and the other one was left uncoated. Before conducting any experiments, the lift and drag coefficients were estimated for different angles of attack using XFOIL, a program developed to analyze subsonic isolated airfoils. XFOIL analyzes the 2D airfoil profile of a NACA 6415 under viscous flow conditions with a Reynolds number of 90,000 and a Mach number of 0.09 to compute the lift and drag characteristics of the airfoil. The mounting system was designed using Autodesk Inventor and was tailored specifically for use with the NACA 6415 cross-section and the 6-Axis load cell. The mounting system consisted of an airfoil mount and two circular plates as part of the load cell mounts, one of which was fixed to the base of the wind tunnel and the other was fixed to the bottom of the load cell. The two load cell plates were designed in such a way that the top plate could rotate on top of the bottom plate, with increments of 1°, covering the complete 360° range. This design feature was used to change the angle of attack of the wing section attached to the load cell. The plates were also designed to have 360 holes so that the plates could be pinned to hold the testing system at a certain angle of attack.

After the CAD drawing was made, the mounting system was 3D-printed using PLA (Polylactic Acid) filament with a 100 infill to provide structural rigidity. Each wing section was attached to a 6-Axis load cell in the wind tunnel, which in turn was attached to the base of the wind tunnel. The 6-Axis load cell measured the forces and torques acting on the surface of the load cell and had a left-handed coordinate system. The wings were placed in a recirculating wind tunnel with a rectangular test section with a cross-section measuring 1.05 m×1.65 m. The wings were tested at a constant wind speed of 17 m/s, so as to match the conditions used in XFOIL, which corresponds to a chord Reynolds number of approximately 50,000. The forces and torques acting on the wing were measured simultaneously by the load cell for a given angle of attack. The force and torque measurements were used to determine the 2D drag and lift curves for the airfoil, with and without the icephobic coating.

Figure 12B:
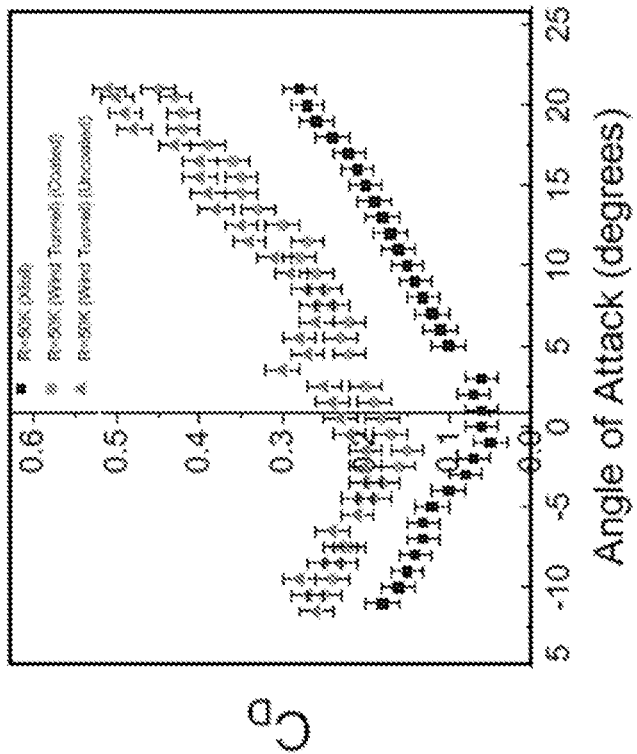
FIG. 12B shows drag coefficients for wings coated with exemplary icephobic coatings and uncoated wings as a function of angle attack.
Figure 12A:
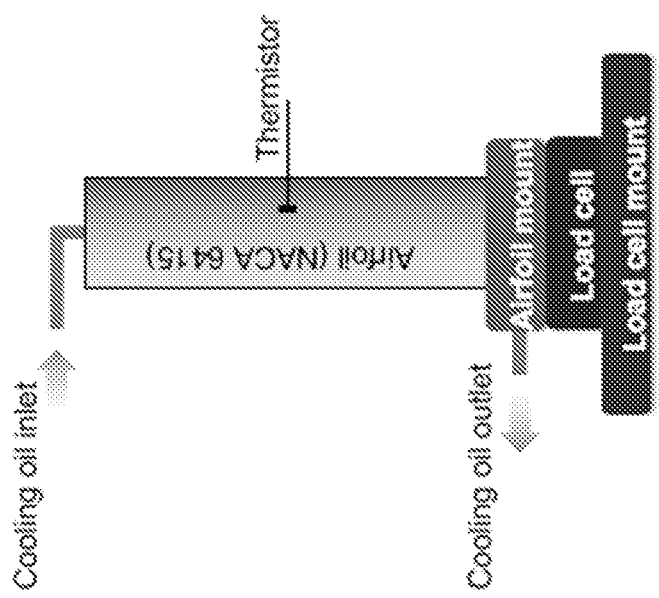
FIG. 12A shows a schematic of an experimental setup to evaluate aerodynamic properties of icephobic coatings in accordance with preferred embodiments described herein.
Figure 12D:
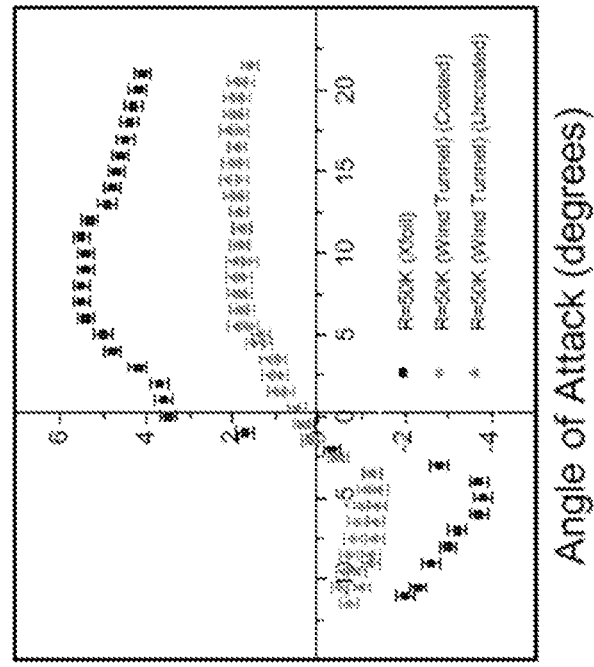
FIG. 12D shows ratio of lift/draft of airfoils coated with exemplary icephobic coatings and uncoated airfoils as a function of angle attack.
Figure 12C:
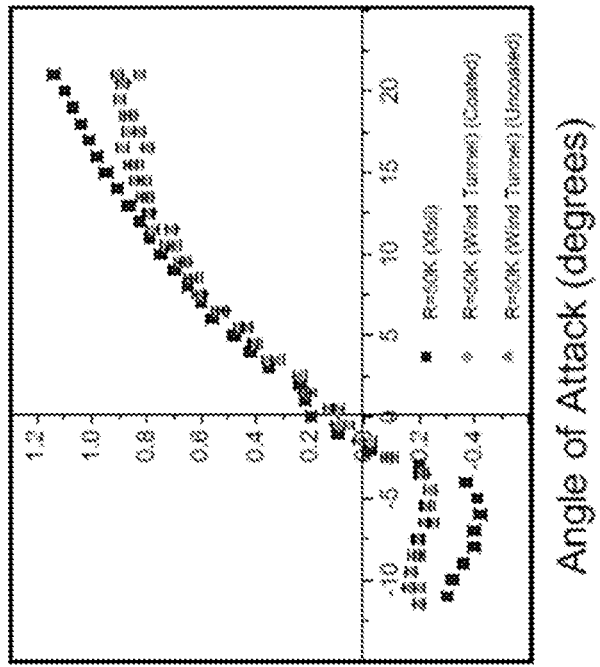
FIG. 12C shows lift coefficients for wings coated with exemplary icephobic coatings and uncoated wings as a function of angle attack.

The experimental setup is shown in FIG. 12A. The lift and drag coefficients for the coated and uncoated wing sections were plotted against angle of attack in FIG. 12B and FIG. 12C. Furthermore, the ratio of lift/drag versus of angle of attack is plotted in FIG. 12D. The experimental data sets for both coefficients of lift and drag are accompanied by error bars, which were calculated based off the resolution of the load cell. The XFOIL data sets do not have any corresponding error bars, since this was a computational value. The results indicate that lift and drag for the coated wing and the uncoated wing have a similar trend for different angle of attacks and the difference in magnitudes on both is small. The magnitude of lift and drag coefficients of the airfoils found experimentally differs from the XFOIL computational results because XFOIL is a 2D computational tool that does not account for three dimensional effects, such as the 3D characteristics of the finite wing. In a finite wing, the higher-pressure air from beneath the wing tries to move towards the lower pressure above the wing. Moreover, the new experimental data indicate that the coating does not affect the lift and drag characteristics of a wing, which is important in any passive alternative for deicing aerospace systems.

Figure 13A:
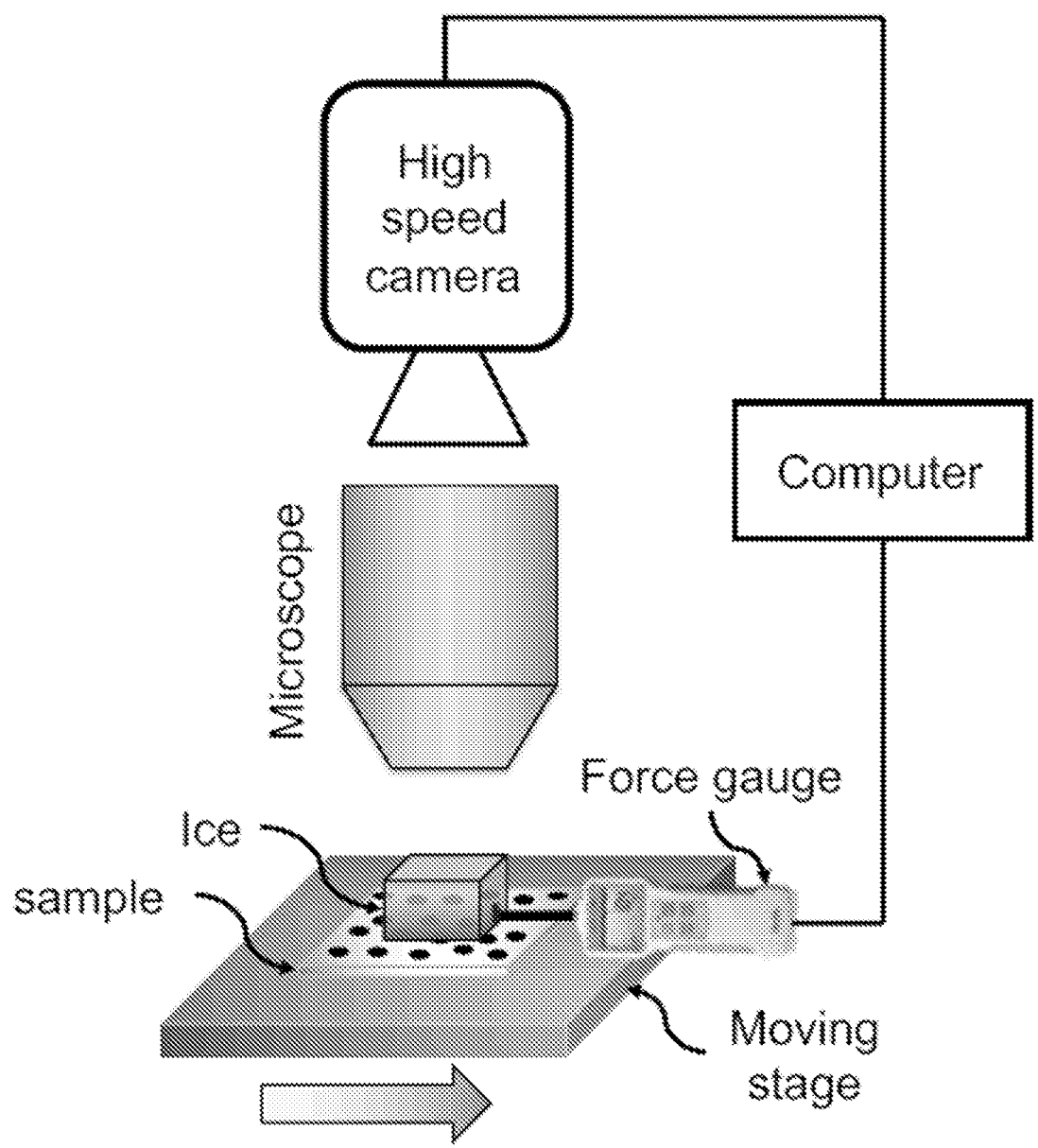
FIG. 13A shows a schematic of an experimental setup to evaluate crack initiation in ice found on Phase II coordinates in exemplary icephobic coatings.
Figure 13B:
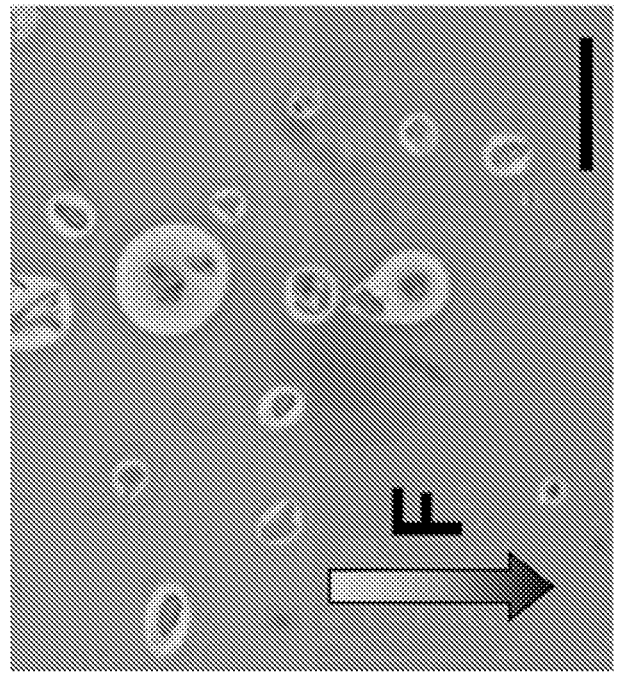
FIG. 13B shows images of interfacial cavities in ice formed at Phase II coordinates in exemplary icephobic coatings obtained through optical microscope and high-speed imaging.

To demonstrate the role of stress localization function on ice adhesion, an experimental procedure was designed to probe crack nucleation at the material-ice interface. A form of the icephobic material was developed and was applied to a glass substrate. The coating included PDMS matrix and black organogel particles to provide contrast for visualization of crack nucleation at the material-ice interface. Organogel particles were included at 5% concentration according to volume in the PDMS matrix. The dimension of the organogel particles was between about 100 nm and 20 microns. A silanized glass prism (15 mm×15 mm×25 mm) was placed on the icephobic material to resemble interaction of ice with the coating. The glass slide was placed on a moving stage, the movement of which is controlled by a motorized motion controller and computer. The motorized stage was a syringe pump with forward velocity variation of 0.5 μm/s to 5 mm/s. A firmly held beam load cell (Imada, model DS2-110) was used to measure the force. The force was applied at a distance of 1 mm above the interface. The interface of the icephobic material-prism was viewed as shown in FIG. 13A. Through a coupled optical microscope and a high-speed camera system, the crack nucleation at the interface was probed. FIG. 13B shows micrograph of interfacial cracks observed during these experiments. As shown, all the interfacial cracks were formed at the coordinate of phase II particles having low shear modulus. That is, phase II particles were responsible for cavitation and crack initiation at the interface. The fringes observed at the crack coordinates indicated the ellipsoidal form of these cavities. The generated crack induces a local stress field and the stored elastic energy depends on shear modulus of phase I and the dimension of these cracks. This stored elastic energy leads to a shear force at the front of crack, propagation of crack, and detachment of ice from the material.

To determine the value of the stress-localization function for examples of the stress-localized icephobic materials, the values of $\overline{W_a}$, the work of adhesion of the material, and $G_m$, the shear modulus of the material, were determined. Work adhesion is determined as $W_a = \gamma^w(1+\cos\theta)$, where $\gamma^w$ denotes surface tension of liquid (i.e. water) at −20° C. and θ is the contact angle of sessile droplet on the surface. The contact angle of water was determined for the various samples and the work of adhesion was consequently determined. The shear modulus of the example materials was also measured using a Dynamic Mechanical Analyzer (DMA). The measured values are shown in Table 2 below.

TABLE 2

| | Phase I | Phase II | AI-10 | AI-11 | AI-12 | AI-13 |
|---|---|---|---|---|---|---|
| $\overline{W_a}$ (mN/m) | 48 | 70 | 57 | 53 | 51 | 49 |
| $G_m$ (MPa) | 3.5 +/− 0.5 | NA | 0.6 +/− 0.5 | 0.9 +/− 0.5 | 1.4 +/− 0.5 | 1.8 +/− 0.5 |

Figure 13C:
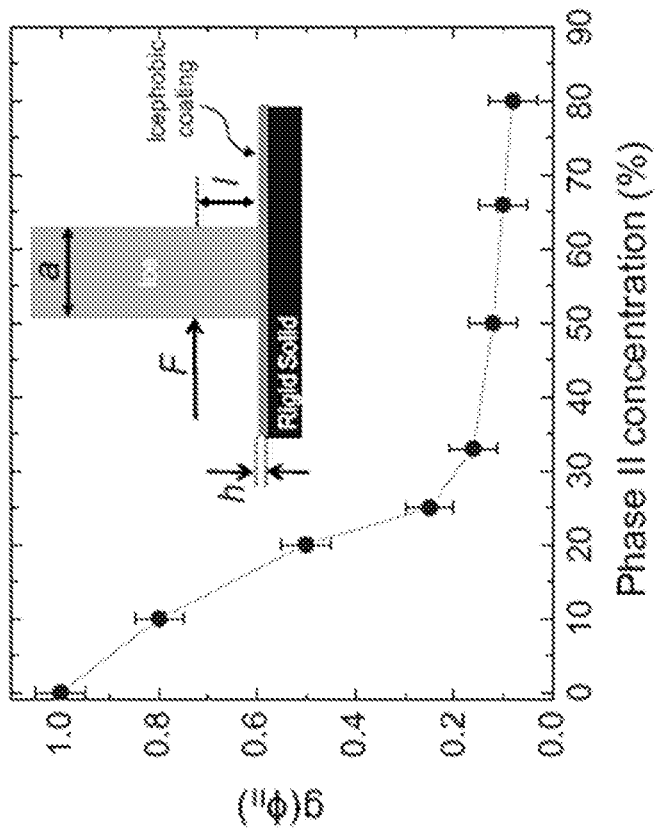
FIG. 13C shows stress localization as a function of concentration of Phase II particles in exemplary icephobic coatings.

Using the figures in Table 2, the values of the stress localization function were determined and plotted as shown in FIG. 13C. The stress localization function depends on the concentration of phase II in the material structure as predicted. This stress-localization function reduces ice adhesion on the icephobic material up to an order of magnitude. The role of the stress localization function on reduction of ice adhesion is several times higher than the role of shear modulus. For example, comparing the sample AI-10 and pure silicon elastomer, the difference of shear modulus is approximately six times which results in ~2.5 times reduction in ice adhesion. However, for the same samples, stress localization reduces the ice adhesion by more than 12 times. The stress localization function depends on geometrical parameters (a and l) along with volumetric fraction of phase II. For high values of all the role of normal force is dominant in the fracture and the role of stress localization (i.e. shear force) is small. However, for low values of all, the fracture is governed by shear forces and the stress localization is the dominant factor. The developed physic of stress-localization is applicable in detachment of any solid material (ice, dust and even bio-species) from elastomers.

The invention claimed is:

1. A surface having anti-icing properties, comprising:
   a surface; and
   a viscoelastic icephobic coating deposited on the surface, wherein the viscoelastic icephobic coating comprises an elastomer matrix and organogel particle beads dispersed throughout the elastomer matrix, wherein the organogel particle beads comprise a non-crosslinked liquid phase entrapped in a three-dimensionally cross-linked gel, wherein the elastomer matrix is cured to form the viscoelastic icephobic coating, and wherein the viscoelastic icephobic coating imparts anti-icing properties to the surface.

2. The surface of claim 1, wherein the elastomer matrix comprises polyurethane, poly isoprene, silicone rubber, or combinations thereof.

3. The surface of claim 1, wherein the organogel particle beads comprise polyacrylamide, polydimethylsiloxane, or combinations thereof.

4. The surface of claim 1, wherein the organogel particle beads comprise one or more siloxanes, ethyl benzene, or combinations thereof.

5. The surface of claim 1, wherein the organogel particle beads comprise dimethyl siloxane, dimethylivinyl terminated silica, dimethylvinylated silica, trimethylated silica, tetra (trimethoxysiloxy) silane, ethyl benzene, dimethyl methylhydrogen siloxane, tetramethyl tetravinyl cyclotetra siloxane, or combinations thereof.

6. The surface of claim 1, wherein the organogel particle beads are about 10 nm to about 100 microns in diameter.

* * * * *